US 11,980,999 B2

(12) United States Patent
Sugaya

(10) Patent No.: US 11,980,999 B2
(45) Date of Patent: May 14, 2024

(54) SHOT-PROCESSING DEVICE

(71) Applicant: Sintokogio, Ltd., Aichi (JP)

(72) Inventor: Takanori Sugaya, Aichi (JP)

(73) Assignee: SINTOKOGIO, LTD., Aichi (JP)

( * ) Notice: Subject to any disclaimer, the term of this patent is extended or adjusted under 35 U.S.C. 154(b) by 1081 days.

(21) Appl. No.: 16/647,866

(22) PCT Filed: Aug. 7, 2018

(86) PCT No.: PCT/JP2018/029555
§ 371 (c)(1),
(2) Date: Mar. 16, 2020

(87) PCT Pub. No.: WO2019/064938
PCT Pub. Date: Apr. 4, 2019

(65) Prior Publication Data
US 2020/0282518 A1    Sep. 10, 2020

(30) Foreign Application Priority Data

Sep. 28, 2017  (JP) .................................. 2017-187864

(51) Int. Cl.
*B24C 9/00*       (2006.01)
*B24C 1/10*       (2006.01)
(Continued)

(52) U.S. Cl.
CPC .................. *B24C 9/00* (2013.01); *B24C 1/10* (2013.01); *B24C 1/04* (2013.01); *B24C 3/22* (2013.01); *B24C 3/24* (2013.01); *B24C 3/32* (2013.01)

(58) Field of Classification Search
CPC .... B24C 1/10; B24C 3/22; B24C 3/24; B24C 9/00; B24C 1/02; C21D 7/06
(Continued)

(56) References Cited

U.S. PATENT DOCUMENTS 5,556,324 A * 9/1996 Shank, Jr. ................. B24C 9/00
                                                              451/87
6,238,268 B1 * 5/2001 Wern ...................... B24C 11/00
                                                              451/36
(Continued)

FOREIGN PATENT DOCUMENTS

CN        102371544 A      3/2012
CN        102958647 A      3/2013
(Continued)

OTHER PUBLICATIONS

Office Action for corresponding CN Application No. 201880060954.8 dated Jun. 24, 2021.
(Continued)

*Primary Examiner* — Edward T Tolan
(74) *Attorney, Agent, or Firm* — Finnegan, Henderson, Farabow, Garrett & Dunner, LLP

(57) ABSTRACT

A shot-processing device is provided, and by it they are effectively reused and prevented from being taken out of a cabinet and from scattering. A structure (40) for a flow path that connects the inside of the cabinet (12) and a suction port (70A) of a dust collector (70) includes a part of a route for circulation of a circulating machine (32) and a second flow path (40Y) that connects a chamber for blowing air and the suction port (70A). In the structure for the flow path a classifying part (35) is provided. It includes a first cyclone (36) that classifies particulate objects that include shots as shots that have a diameter that makes them reusable and as the other particulate objects and includes a part of the first flow path (40X), and a second cyclone (44) that includes a part of the second flow path.

10 Claims, 7 Drawing Sheets

(51) Int. Cl.
  *B24C 1/04*  (2006.01)
  *B24C 3/22*  (2006.01)
  *B24C 3/24*  (2006.01)
  *B24C 3/32*  (2006.01)

(58) Field of Classification Search
  USPC .............................................................. 72/53
  See application file for complete search history.

(56) References Cited

U.S. PATENT DOCUMENTS

| | | | | |
|---|---|---|---|---|
| 7,832,243 | B2 * | 11/2010 | Ushida | B24C 9/006 |
| | | | | 29/90.7 |
| 9,511,479 | B2 * | 12/2016 | Yamamoto | B24C 9/006 |
| 10,300,580 | B2 * | 5/2019 | Yamamoto | B24C 1/10 |
| 11,161,220 | B2 * | 11/2021 | Ito | B24C 9/00 |
| 2011/0034119 | A1 * | 2/2011 | Mase | B24C 9/00 |
| | | | | 451/88 |
| 2013/0213104 | A1 | 8/2013 | Yamamoto | |
| 2013/0327105 | A1 | 12/2013 | Yamamoto | |
| 2014/0329444 | A1 | 11/2014 | Yamamoto | |
| 2014/0360241 | A1 | 12/2014 | Yamamoto | |

FOREIGN PATENT DOCUMENTS

| | | |
|---|---|---|
| CN | 103201073 A | 7/2013 |
| CN | 204108852 U | 1/2015 |
| JP | U 11977093990 | 8/1977 |
| JP | S 57178666 A | 11/1982 |
| JP | 06-015965 U | 3/1994 |
| JP | 2009-000762 | 1/2009 |
| JP | 2012-035389 A | 2/2012 |
| JP | 2012-101304 A | 5/2012 |
| JP | 2013-146825 A | 8/2013 |
| JP | 2015-077638 A | 4/2015 |
| KR | 10-2013-0091336 | 8/2013 |
| WO | WO 2012-060125 A1 | 10/2012 |

OTHER PUBLICATIONS

International Search Report for PCT/JP2018/029555 mailed Oct. 23, 2018.

* cited by examiner

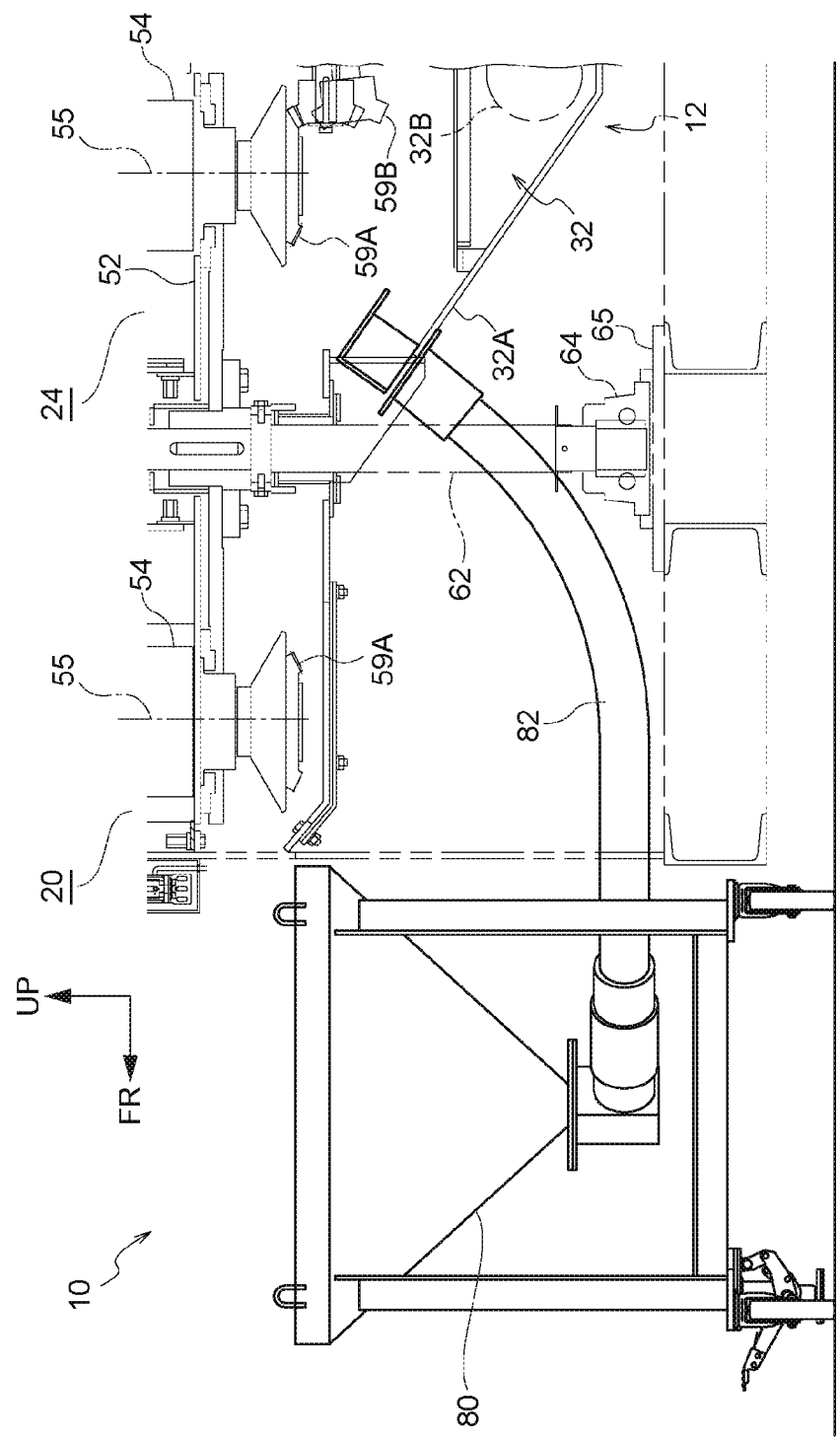

SHOT-PROCESSING DEVICE

TECHNICAL FIELD

The present invention relates to a shot-processing device.

BACKGROUND ART

A shot-processing device that has a separator or a settling chamber has been known (for example, see Patent Literature 1). In such a device the separator or the settling chamber is provided to the route to circulate the shots to separate the shots that are reusable from other particulate objects. Thus, the device effectively contributes to the reuse of the shots.

However, in such device preventing the shots from being taken out of the cabinet or from scattering is not considered. Thus, there is room to improve the device in preventing shots from being taken out of the cabinet and from scattering.

By considering the above facts, the present invention was invented to provide a shot-processing device by which they can be effectively reused and prevented from being taken out of the cabinet and from scattering.

PRIOR-ART PUBLICATION

Patent Literature

[Patent Literature 1]
Japanese Patent Laid-open Publication No. 2012-101304

SUMMARY OF INVENTION

A shot-processing device of a first aspect of the present invention comprises a cabinet in which multiple chambers are formed. It also comprises a transporter that transports an object to be processed in a set direction for transportation within at least the cabinet. It also comprises a shot-projecting machine that is placed in a chamber for projecting the shots, which is one of the multiple chambers, and that projects the shots onto the object to be processed that has been transported into the chamber for projecting the shots. It also comprises an air-blowing machine that is placed in a chamber for blowing air, which is one of the multiple chambers, that is downstream of the chamber for projecting the shots in the direction for transportation, which machine blows air onto the object to be processed that has been transported into the chamber for blowing air. It also comprises a circulating machine that circulates the shots that have a diameter that makes them reusable among the shots that have been projected by the shot-projecting machine and have dropped on a bottom of the chamber for projecting the shots. It also comprises a dust collector that is connected to the cabinet to suction air therein that contains dust. It also comprises a structure for a flow path that consists of a first flow path that forms a part of a flow path to connect the inside of the cabinet with a suction port of the dust collector and is configured to be a part of a route for circulation of the circulating machine and of a second flow path that connects the chamber for blowing air with the suction port of the dust collector. It also comprises a classifying part that is provided in the structure for the flow path, which includes a part of the first flow path and a part of the second flow path, and that classifies the particulate objects that include the shots as shots that have a diameter that makes them reusable and as the other particulate objects.

Incidentally, the first flow path and the second flow path may be separately constructed without having a portion that is used for both the first and second parts of the flow path or may be constructed with a portion that is used for both of them.

By the above configuration, the multiple chambers are formed within the cabinet. The transporter transports the object to be processed in the set direction for transportation, at least in the cabinet. In the chamber for projecting the shots that is formed in the cabinet the shot-projecting machine is provided to project the shots onto the object to be processed that has been transported into that chamber. In the cabinet, the chamber for blowing air is formed downstream of the chamber for projecting the shots in the direction for transportation. The air-blowing machine that is provided in the chamber for blowing air blows air onto the object to be processed that has been transported into that chamber. Further, the circulating machine is provided to the shot-processing device of the present invention to circulate to the shot-projecting machine the shots that have been projected by the shot-projecting machine and have dropped on the bottom of the chamber for projecting the shots.

The dust collector that is connected to the cabinet suctions air in the cabinet that contains dust. The structure for the flow path that forms a flow path to connect the inside of the cabinet with the suction port of the dust collector includes the first flow path, which is a part of the route for circulation of the circulating machine. The classifying part that is provided in the structure for the flow path includes a part of the first flow path and classifies the particulate objects that include the shots as shots that have a diameter that makes them reusable and as the other particulate objects. Thus, the circulating machine can circulate the shots that have a diameter that makes them reusable to the shot-projecting machine.

Further, the structure for the flow path includes the second flow path. It connects the chamber for blowing air with the suction port of the dust collector. The classifying part includes a part of the second flow path. Thus, the particulate objects that have been stirred up from the object to be processed, etc., by the air that is blown by the air-blowing machine in the chamber for blowing air, are suctioned to the second flow path so as to be classified as shots that have a diameter that makes them reusable and as the other particulate objects. Thus, the shots are prevented from being taken out of the cabinet, and are effectively reused.

By the shot-processing device of a second aspect of the present invention, in the configuration of the first aspect, the classifying part comprises a first classifier that includes a part of the first flow path and a second classifier that is a separate body from the first classifier and includes a part of the second flow path. The first classifier is located nearer the cabinet than is the second classifier.

By the above configuration, the first classifier, which includes a part of the first flow path, is located nearer the cabinet than is the second classifier, which includes a part of the second flow path. Thus, the shots can be circulated with little loss.

By the shot-processing device of a third aspect of the present invention, in the configuration of the first or second aspect, the structure for the flow path comprises a third flow path that connects a chamber for taking out an object to be processed with the suction port of the dust collector, wherein the chamber for taking out an object to be processed is one of the multiple chambers in the cabinet that is located at a side for taking out the object to be processed. The classifying part includes a part of the third flow path.

Incidentally, the third flow path may not include any part that is used for both the first flow path and the second flow path, but may include a part that is used for either the first flow path or the second flow path.

By the above configuration, even when the particulate objects are conveyed to the chamber for taking out an object to be processed without suctioning all the particulate objects in the chamber for blowing air, the particulate objects in the chamber for taking out an object to be processed are suctioned through a flow path that is formed by the third flow path. The suctioned particulate objects are classified into the shots that have a diameter that makes them reusable and the other particulate objects by the classifying part. Thus, the shots are prevented from being taken out of the chamber for taking out an object to be processed and are effectively reused.

By the shot-processing device of a fourth aspect of the present invention, in the configuration of the third aspect, which refers to the second aspect, the classifying part that constitutes a part of the third flow path is the second classifier.

By the above configuration, since in the third flow path the particulate objects are classified by the second classifier, the configuration is not complicated, and the shots are prevented from being taken out of the chamber for taking out an object to be processed and effectively reused.

The shot-processing device of a fifth aspect of the present invention, in the configuration of any of the first to fourth aspects, comprises a jig for holding the object to be processed, on which jig the object to be processed is placed, wherein the jig has supporting parts that support the object to be processed from the lower part and are provided with a gap in the circumferential direction in the plan view of the device. The air-blowing machine has a blowing part in which a direction for blowing is set so that air that is blown therefrom passes between adjacent supporting parts.

By the above configuration, the jig for supporting the object to be processed supports that object by means of the supporting parts that are provided with a gap in the circumferential direction in the plan view of the device. The air-blowing machine has a blowing part in which a direction for blowing is set so that air that is blown from it passes between the adjacent supporting parts. Thus, the particulate objects that have adhered to the lower part of the object to be processed are blown off and away by the air that is blown from the blowing part. The particulate objects are suctioned by a flow path that is formed by the second flow path. Thus, the particulate objects that have adhered to the lower part of the object to be processed can be effectively removed.

The shot-processing device of a sixth aspect of the present invention, in the configuration of the fifth aspect, comprises a tubular hood that is located outside the object to be processed in the plan view of the device and comprises jigs for the hood that support the hood from the bottom. The jigs are provided with a gap in the circumferential direction in the plan view of the device. In the blowing part the direction for blowing is set so that air that is blown therefrom passes between adjacent jigs for supporting the hood.

By the above configuration, since the tubular hood is provided outside the object to be processed in the plan view of the device, the shots can be prevented from hitting the outside of the object to be processed. The jigs for the hood are provided with a gap in the circumferential direction in the plan view of the device to support the hood from the bottom. The direction for blowing of the blowing part is set so that air that is blown from it passes between the adjacent jigs for supporting the hood. Thus, even when the hood is provided outside of the object to be processed, the particulate objects that have adhered to the lower part of the object to be processed are blown off and away by the air that is blown from the blowing part of the air-blowing machine. The particulate objects are suctioned by a flow path that is formed by the second flow path. Thus, even when the hood is provided, the particulate objects that have adhered to the lower part of the object to be processed can be effectively removed.

The shot-processing device of a seventh aspect of the present invention, in the configuration of any of the first to sixth aspects, comprises a receiving part at the side for taking out that protrudes from the cabinet under a port for taking out, in the plan view of the device. It also comprises a duct for taking out that connects the receiving part at the side for taking out with the cabinet and causes the shots that have dropped on the receiving part at the side for taking out to flow to the upstream side of the route for circulation in the cabinet.

By the above configuration, the receiving part at the side for taking out protrudes from the cabinet under the port for taking out of the cabinet in the plan view of the device. Thus, even when the particulate objects fall from the port for taking out or near it, they are received by means of the receiving part at the side for taking out. Further, the receiving part at the side for taking out is connected to the cabinet by means of the duct for taking out. The duct for taking out causes the shots that have dropped on the receiving part at the side for taking out to flow to the upstream side of the route for circulation in the cabinet. Thus, the shots that have fallen near the port for taking out can be returned to the shot-projecting machine.

The shot-processing device of an eighth aspect of the present invention, in the configuration of any of the first to seventh aspects, comprises an access door to open and close a side opening of the cabinet. It also comprises a receiving part at a side wall under the side opening, which part protrudes from the cabinet in the plan view of the device. It also comprises a duct at the side wall that connects the receiving part at the side wall with the cabinet and causes the shots that have dropped on the receiving part at the side wall to flow to the upstream side of the route for circulation in the cabinet.

By the above configuration, the access door can open and close the side opening of the cabinet. The receiving part at the side wall is provided under the side opening to protrude from the cabinet in the plan view of the device. Thus, even when the particulate objects drop from the side opening or near it when the access door is opened for checking or cleaning the inside of the cabinet or the like, the particulate objects are received by means of the receiving part at the side wall. The receiving part at the side wall and the cabinet are connected by means of the duct at the side wall. The duct causes the shots that have dropped on the receiving part at the side wall to flow in the upstream direction of the route for circulation in the cabinet. Thus, the shots that drop from the side opening or near it can be returned to the shot-projecting machine.

The shot-processing device of a ninth aspect of the present invention, in the configuration of any of the first to eighth aspects, comprises a cylindrical ventilator that is provided to the ceiling of the cabinet and that takes ambient air in. It also comprises a cartridge that is placed in the ventilator and has a filter that is pleated and faces horizontally.

By the above configuration, the cylindrical ventilator that takes ambient air in is provided to the ceiling of the cabinet.

The cartridge that has a filter that is pleated and faces horizontally is placed in the ventilator. Thus, clogging of the ventilator is prevented.

As discussed above, by the shot-processing device of the present invention excellent effects, such that the shots are effectively reused and prevented from being taken out of the cabinet or from scattering, are achieved.

The basic Japanese patent application, No. 2017-187864, filed Sep. 28, 2017, is hereby incorporated by reference in its entirety in the present application.

The present invention will become more fully understood from the detailed description given below. However, the detailed description and the specific embodiments are only illustrations of the desired embodiments of the present invention, and so are given only for an explanation. Various possible changes and modifications will be apparent to those of ordinary skill in the art on the basis of the detailed description.

The applicant has no intention to dedicate to the public any disclosed embodiment. Among the disclosed changes and modifications, those which may not literally fall within the scope of the present claims constitute, therefore, a part of the present invention in the sense of the doctrine of equivalents.

The use of the articles "a," "an," and "the" and similar referents in the specification and claims are to be construed to cover both the singular and the plural form of a noun, unless otherwise indicated herein or clearly contradicted by the context. The use of any and all examples, or exemplary language (e.g., "such as") provided herein is intended merely to better illuminate the invention, and so does not limit the scope of the invention, unless otherwise stated.

BRIEF DESCRIPTION OF DRAWINGS

FIG. 7 is a side view of the receiving part at the side for taking out, the duct for taking out, and their periphery.

DESCRIPTION OF EMBODIMENTS

Figure 1:
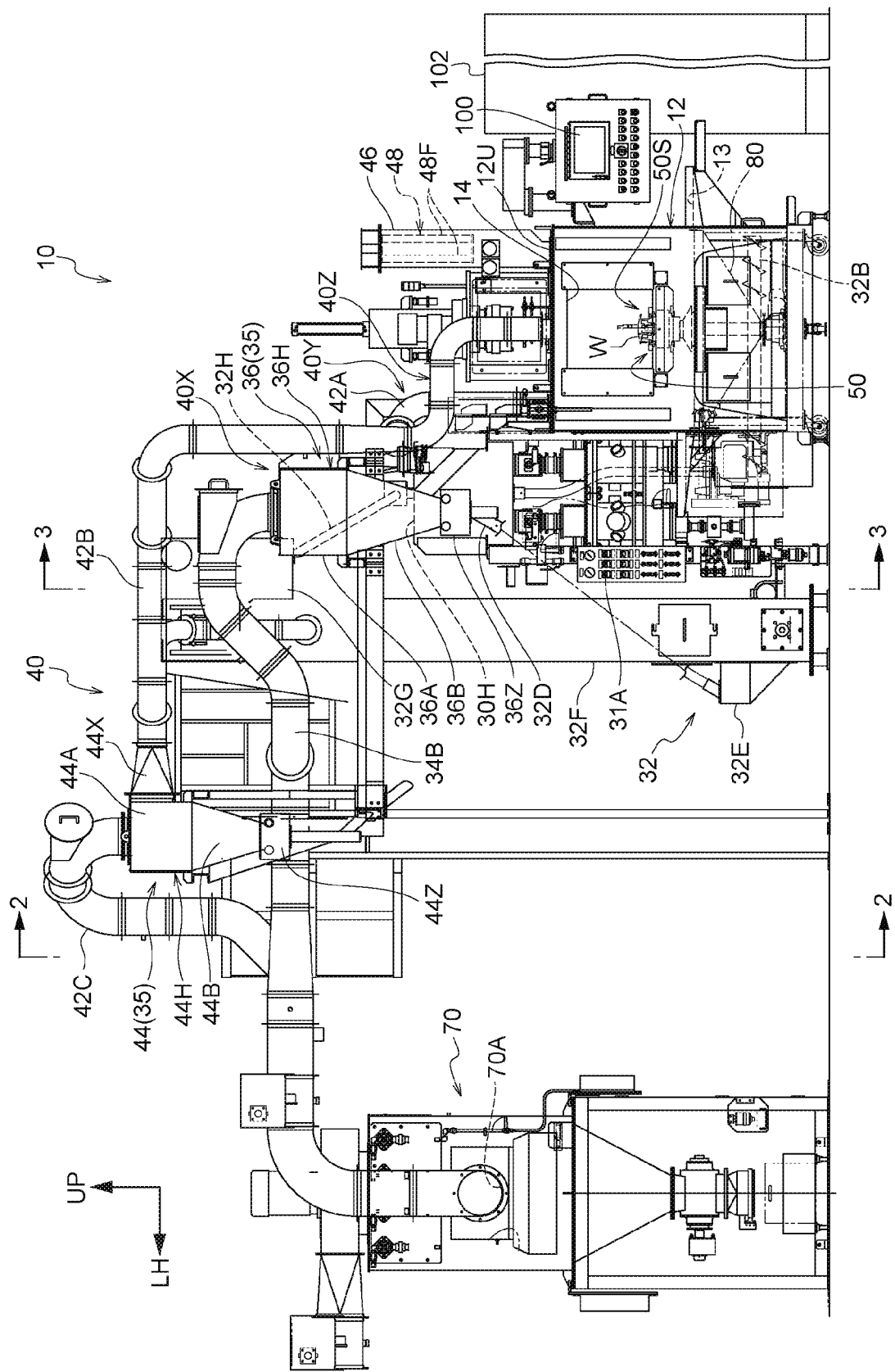
FIG. 1 is a front view of the shot-peening device, which is an embodiment of the present invention. Some elements in the front side, such as the receiving part at the side for taking out, are shown in perspective. Their outlines are drawn by two-dotted lines.

A shot-peening device 10, which is a shot-processing device as an embodiment of the present invention, is below discussed with reference to FIGS. 1-7. In the drawings, the arrows FR, UP, and LH denote the front direction, the upper direction, and the left direction in a front view of the device, respectively. The shot-peening device 10 is, for example, a device for shot-peening a pulley for a CVT (Continuously Variable Transmission).

Configuration of Embodiment

Figure 2:
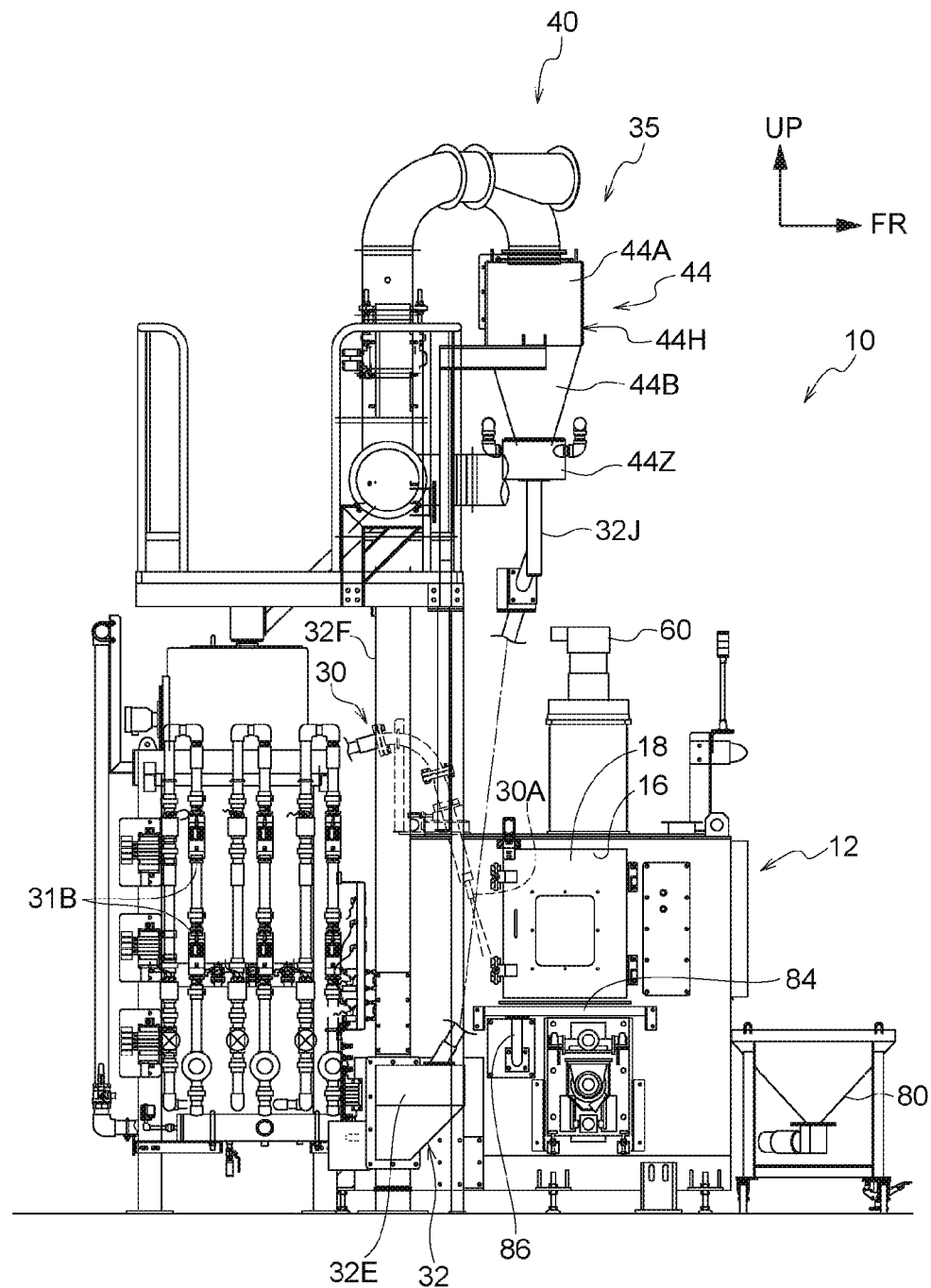
FIG. 2 is an enlarged side view taken along line 2-2 in FIG. 1.
Figure 3:
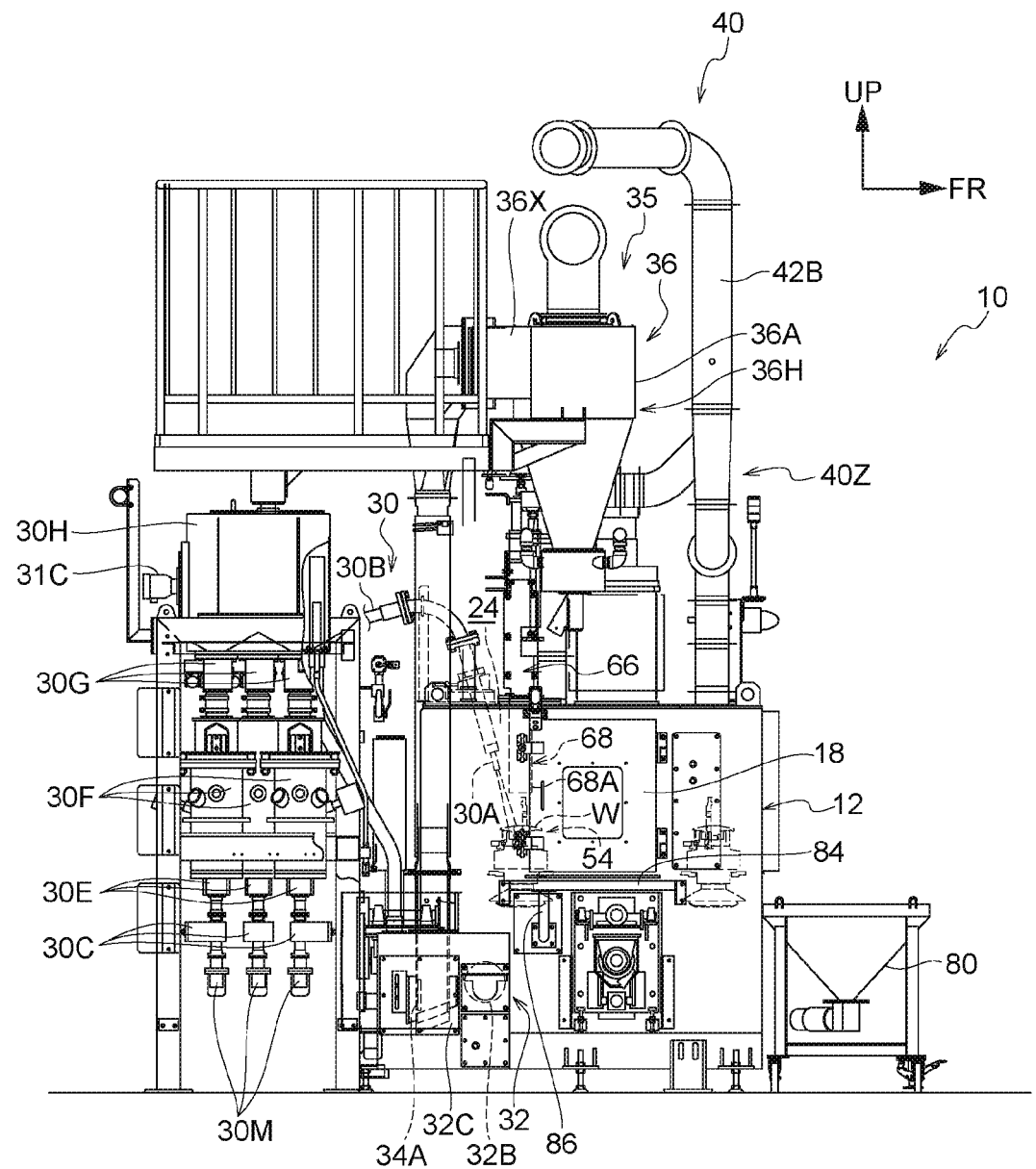
FIG. 3 is an enlarged side view taken along line 3-3 in FIG. 1.

FIG. 1 illustrates a front view of the shot-peening device 10, which is an embodiment of the present invention. In FIG. 1 some elements (a receiving part 80 at the side for taking out, etc., which are discussed below) are shown as being transparent and their outlines are shown by two-dotted lines. FIG. 2 shows an enlarged side view taken along the line 2-2 in FIG. 1. FIG. 3 shows an enlarged side view taken along the line 3-3 in FIG. 1.

As in FIG. 1, the shot-peening device 10 has a cabinet 12 that is formed like a box. In the cabinet 12 a part 13 for supplying the shots is provided. A port for supplying the shots is formed at the top of the part 13 for supplying the shots. In the cabinet 12 a port 14 for carrying an object W to be processed in and out of it is formed. The port for carrying in and out functions as a port for carrying the work W in the cabinet and as a port for carrying the work W out of the cabinet. At the lower position of the cabinet 12 a part 50S for placing a product is provided to place the object W on it. The details of the part 50S are discussed below.

Figure 4:
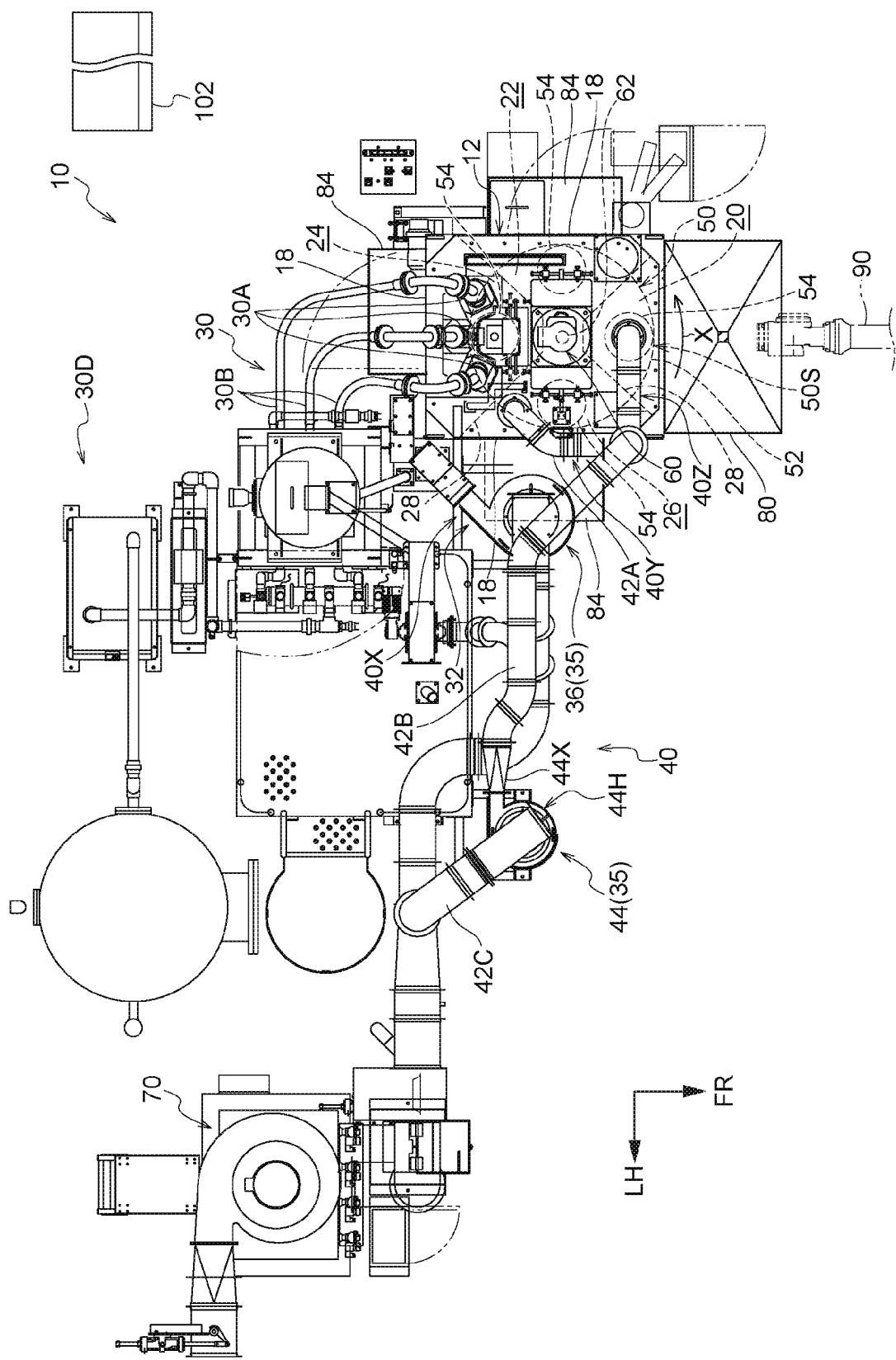
FIG. 4 is a plan view of the shot-peening device, which is an embodiment of the present invention.

As in FIG. 2, in the cabinet 12 an access door 18 is provided. The access door 18 opens and closes a side opening 16 of the cabinet 12. FIG. 4 illustrates a plan view of the shot-peening device 10. As in FIG. 4, as an example in the embodiment, the access doors 18 are located at the right and left sides and the rear side of the cabinet 12. Incidentally, the access door 18 overlaps a peripheral wall of the cabinet 12 in FIG. 4. Thus, the reference number "18" points to the overlapping position.

As in FIG. 1, at the right side of the cabinet 12 an operator's panel 100 is provided. A control panel 102 that is connected to the operator's panel 100 includes a storage device that stores a program for controlling the shot-peening device 10. The shot-peening device 10 is operated by running the program in accordance with the operation of a panel by an operator.

At the right side of the ceiling 12U of the cabinet 12 a ventilator 46, which is tubular, takes the outside air in. Inside the ventilator 46 a cartridge 48 is disposed. The cartridge 48 is a cartridge for a dust collector, which is converted to this use. It has a filter 48F (the details are not shown), wherein a filter medium is horizontally folded in a zig-zag manner. Incidentally, the cartridge for the dust collector is disclosed, for example, in a Patent Gazette, U.S. Pat. No. 5,218,451.

As in FIG. 4, in the cabinet 12 a transporter 50 is provided. The transporter 50 transports an object W to be processed (see FIG. 1) (below, a description of a figure to be referred to is arbitrarily omitted) in the set direction for transportation (the direction of the arrow X) within the cabinet 12. The transporter 50 includes the part 50S for placing a product. The details of the transporter 50 are discussed below.

Multiple chambers are formed in the cabinet 12. At the rear side of the inside of the cabinet 12 a chamber 24 for projecting the shots is formed. At the front side of the inside of the cabinet 12 a chamber 20 for taking in and out is formed. In the chamber 24 for projecting the shots a surface treatment (specifically, a shot-peening treatment) on the object W to be processed is carried out by causing the shots to hit the object W. In the cabinet 12 the chamber 20 for taking in and out doubles as a chamber for taking in the object W and as a chamber for taking it out. In the cabinet 12 an idle chamber 22 is formed at the upstream side of the chamber 24 for projecting the shots in the direction for transportation (the direction of the arrow X). In the cabinet 12 a chamber 26 for blowing air is formed at the downstream side of the chamber 24 for projecting the shots in the direction for transportation (the direction of the arrow X). In the chamber 26 for blowing air gas is blown onto the object W.

The chamber 20 for taking in and out, the idle chamber 22, the chamber 24 for projecting the shots, and the chamber 26 for blowing air, are divided by partitions 28 that are wall panels and are formed side by side about a vertical axis of the device (specifically, a rotating shaft 62, which is later discussed). They may also be called "stations." In other words, multiple stations are formed by equally dividing the inside of the cabinet 12 in the circumferential direction. Incidentally, the chambers are just divided by the partitions 28 and are not hermetically divided.

On the ceiling of the chamber 24 for projecting the shots a plurality of nozzles 30A of a blasting machine (also called "an air-type accelerator") 30, as the shot-projecting machine, are provided (see FIGS. 2 and 3). The blasting machine 30 projects the shots onto the object W by blasting ("projecting" in a broader meaning) compressed air that includes the shots through the nozzles 30A (see FIGS. 2 and 3). Here, the object W has been transported to the chamber 24 for projecting the shots. Incidentally, in this embodiment micro-shots of a particle size of about 50 microns are used as the shots.

The nozzles 30A as in FIG. 3 are connected to Magna Valves 30C ("flow control valves" in a broader meaning) through a piping 30B. The Magna Valves 30C are shown in the lower-left part of FIG. 3. They are connected to a part 30D for supplying air (see FIG. 4) and to a pressurized tank 30F through gate cutters 30E. Parts 30M for mixing that are located under the Magna Valves 30C mix the shots from the pressurized tanks 30F and compressed air from the part 30D for supplying air (see FIG. 4). The pressurized tanks 30F are connected to an upper-side hopper 30H through gates 30G for the shots that are located above the pressurized tanks 30F. A pressure switch 31A (see FIG. 1) is provided near the pressurized tanks 30F. Incidentally, flowmeters 31B for air are provided at the rear side of the device as in FIG. 2. The upper-side hopper 30H is located above the gates 30G for the shots as in FIG. 3. A level switch 31C is provided to it.

In the shot-peening device 10 the circulating machine 32 is provided. It circulates the shots to the blasting machine 30 by transporting to the upper-side hopper 30H the shots that have a diameter that makes them reusable out of the shots that have been projected (projected in a broader meaning) through the nozzles 30A by the blasting machine 30 and have dropped on the bottom of the chamber 24 for projecting the shots. The shots that have a diameter that makes them reusable are those that have a diameter by which a desired effect (more than a set level) on a surface treatment can be obtained when they are projected (projected in a broader meaning). They include at least the shots that have a diameter that is equivalent to (substantially equal to) the diameter of unused shots, which are not yet supplied to the shot-peening device 10 (the shot-processing device in a broader meaning) to be projected (projected in a broader meaning). The shots that have a diameter that makes them reusable do not include, for example, the shots that have been broken in the chamber 24 for projecting the shots. As in FIG. 7, the circulating machine 32 has a hopper 32A that collects the shots at the lower side of the chamber 24 for projecting the shots. A lower-side screw conveyor 32B is provided at the lower end of the hopper 32A.

As in FIG. 1, the lower-side screw conveyor 32B is horizontally positioned so that its longitudinal axis runs from the right d to the left in the device. By being rotated around the axis by being driven by a motor, it transports the shots that have dropped from the hopper 32A (see FIG. 7) in the left direction of the device. The downstream end of the lower-side screw conveyor 32B is located next to a box 32C for collection, which is shown in FIG. 3. In the box 32C for collection a lower end of a duct 34A, which is vertically elongated, is located. The upper end of the duct 34A is connected to a first cyclone 36 as the first classifier that constitutes a part of the classifying part 35. That is, the first cyclone 36 is located in the route for circulation of the circulating machine 32.

As in FIG. 1, the first cyclone 36 has a cyclone-case 36H. The top of the cyclone-case 36H is connected to the suction port 70A of the dust collector 70 through a duct 34B. The dust collector 70 has a fan. It is connected to the cabinet 12 through the duct 34B, the first cyclone 36, and the duct 34A (see FIG. 3) to suction air that contains dust in the cabinet 12 by activating the fan. The upper part 36A of the cyclone-case 36H is formed as a vertical cylinder. Its lower part 36B is formed as a cone, which has a smaller diameter, as it is lower. As in FIG. 3, on the side wall of the upper part 36A of the cyclone-case 36H a part 36X for inflow is formed to cause air to flow along the inner wall of the upper part 36A. The part 36X for inflow is formed approximately as a cylinder and is connected to the duct 34A, which is discussed above.

As in FIG. 1, the lower part 36B of the cyclone-case 36H is connected to a box 36Z for collection. By the above configuration, the first cyclone 36 classifies the particulate objects that include the shots as shots that have a diameter that makes them reusable and as the other particulate objects. The box 36Z for collection is connected to a receiving box 32E through a pipe 32D. The receiving box 32E is provided at the lower end of the bucket elevator 32F. That is, the shots that have a diameter that makes them reusable are classified by means of the first cyclone 36 and are supplied to the lower end of the bucket elevator 32F through the pipe 32D and the receiving box 32E. In the drawing the middle part of the pipe 32D is omitted and drawn by a dotted line. A vibrating sieve (not shown) may be provided between the box 36Z for collection and the receiving box 32E.

Since the bucket elevator 32F is publicly known, the detailed discussion on its configuration is omitted. In it an endless belt (not shown) is looped around pulleys that are disposed to be vertically separated. Many buckets (not shown) are attached to the endless belt. The pulleys are rotated by being driven by a motor. By the above configuration, the bucket elevator 32F can scoop the shots by the buckets and transport them from the lower part of the device to the upper part (above the cabinet 12) by rotating the pulleys. The upper end of the bucket elevator 32F is connected to the upper end of the upper-side hopper 30H through a receiving box 32G and a pipe 32H. That is, the shots that are thrown from the upper end of the bucket elevator 32F are supplied to the upper-side hopper 30H through the receiving box 32G and the pipe 32H.

From the cabinet 12, under the port 14 for carrying in and out, the receiving part 80 at the side for taking out protrudes as in the plan view of the device of FIG. 4. Above the receiving part 80 at the side for taking out, a part of a machine 90 for taking the object W in and out of the cabinet 12 moves. The receiving part 80 at the side for taking out is made of a hopper-like container. Its bottom is open.

FIG. 7 illustrates a side view of the receiving part 80 at the side for taking out and its surrounding area. In it a hatching of cross-sections of the cabinet 12 and its surrounding area is omitted. As in FIG. 7, the bottom of the receiving part 80 at the side for taking out and that of the chamber 24 for projecting the shots of the cabinet 12 are connected by the duct 82 for taking out. The duct 82 for taking out causes the shots that have dropped in the receiving part 80 at the side for taking out to flow to the lower part of the chamber 24 for projecting the shots (the upstream side of the route for circulation in the circulating machine 32) within the cabinet 12. In addition, the end of the duct 82 for taking out at the side near the cabinet 12 is located slightly higher than the end at the side near the receiving part 80 at the side for taking out. Since the inside of the chamber 24 for projecting the shots is a vacuum, as it is suctioned by the dust collector 70 (see FIG. 1), the duct 82 for taking out causes the shots to flow from the receiving part 80 at the side for taking out to the cabinet 12.

From the cabinet 12 under the side opening 16 as in FIG. 2, a receiving part 84 at the side wall protrudes in the plan view of the device of FIG. 4. As in FIG. 2, the receiving part 84 at the side wall and the cabinet 12 are connected through the duct 86 at the side wall. The end of the duct 86 at the side wall at the cabinet 12 is located lower than the end of it at the receiving part 84 at the side wall. The duct 86 at the side wall downwardly inclines from the receiving part 84 at the side wall to the cabinet 12 to cause the shots that have dropped in the receiving part 84 at the side wall to fall to the lower part of the cabinet 12 (the upstream side of the route for circulation in the circulating machine 32).

Next, the transporter 50 as in FIG. 1, and the part 50S for placing a product that constitutes it, are discussed.

In the part 50S for placing a product, a large table (also called "a turntable" or "a revolving table") 52 that is circular as in FIG. 4 is provided. A plurality of (four in this embodiment) small tables (also called "rotating tables") 54 are annularly provided with a constant distance between them in the outer circumference on the top of the large table 52. That is, the part 50S for placing a product has a configuration of so-called multiple tables. The large table 52 can revolve about the vertical rotating shaft 62. The plurality of the small tables 54 have a smaller diameter than the large table 52 and are rotatable on the large table 52. The object W to be processed is held on each of them. Rotating shafts 55 (see FIG. 7) of the small tables 54 are parallel to the rotating shaft 62 of the large table 52. The partitions 28 may rotate together with the large table 52.

The small table 54 as in FIG. 4 comes in, and goes out of, the chamber 20 for taking in and out, the idle chamber 22, the chamber 24 for projecting the shots, the chamber 26 for blowing air, and the chamber 20 for taking in and out, in this order, when the large table 52 rotates. In the partitions 28 notches are formed to cause the small tables 54 and the object W to pass therethrough when the large table 52 rotates. In a sheet-like cover that is provided at the outer circumference of the large table 52 in the cabinet 12 apertures (not shown) are formed to pass through them.

The blasting machine 30 projects the shots onto the object W that is held on the small table 54 that enters the chamber 24 for projecting the shots. As in FIG. 7, a first part 59A for engagement is fixed under the small tables 54 and fixed coaxially with the rotating shaft 55. Under the area to be projected in the large table 52 a second part 59B for engagement that engages the first part 59A for engagement is provided. The second part 59B for engagement is rotated about the rotating shaft by a driving mechanism (not shown). That is, when the small table 54 is located at a set position in the chamber 24 for projecting the shots, the first part 59A for engagement engages the second part 59B for engagement so that a driving force that is originated by the driving mechanism is transmitted to the first part 59A for engagement to rotate the small table 54.

The lower end of the rotating shaft 62 of the large table 52 is placed on a base 65 through a bearing 64. The upper end of it is connected to an indexing machine 60 (an element that is known as a rotating mechanism in a broader meaning) through a coupling (not shown).

Since the indexing machine 60 is one that is publicly known, the detailed illustration is omitted. It has a servomotor that intermittently rotates the large table 52 as in FIG. 4. By this configuration the indexing machine 60 rotates the large table 52 about the rotating shaft 62 at an angle (90° in this embodiment) that is determined based on the arrangement of the small tables 54. That is, the indexing machine 60 intermittently rotates the large table 52 at an angle that is determined based on the positions of the small tables 54. When the indexing machine 60 temporarily stops the large table 52 (when it is in the position to stop the rotating), the small tables 54 are located at each of the set positions of the chamber 20 for taking in and out, the idle chamber 22, the chamber 24 for projecting the shots, and the chamber 26 for blowing air. Incidentally, a machine for intermittently rotating that has a driving motor with a brake for intermittently rotating the large table 52, a clamp for positioning the large table 52, and a cylinder for positioning the clamp, may be used instead of the indexing machine 60, which has a servomotor.

Figure 5:
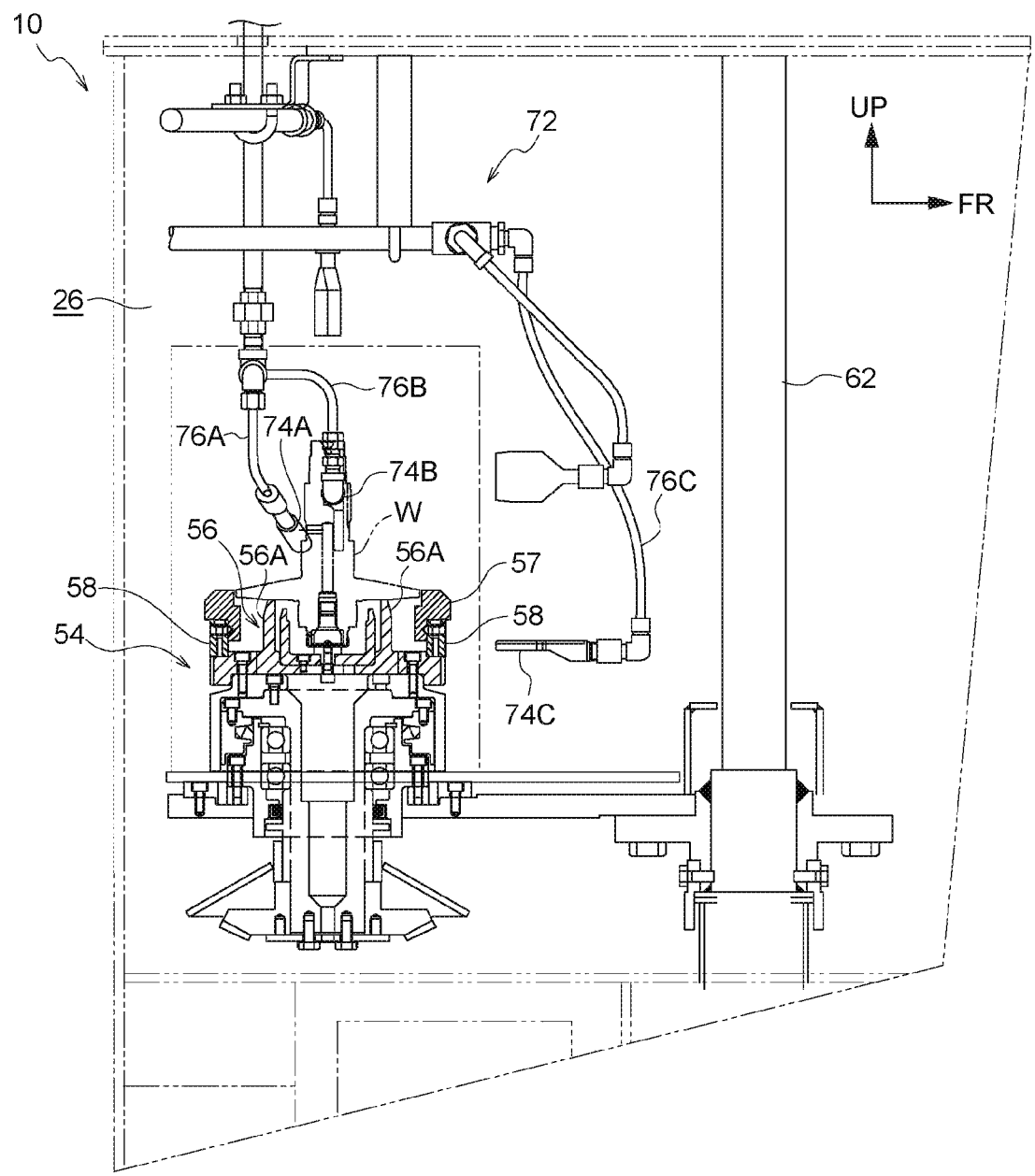
FIG. 5 illustrates a cross section of the chamber for blowing air of the shot-peening device as in FIG. 1.
Figure 6:
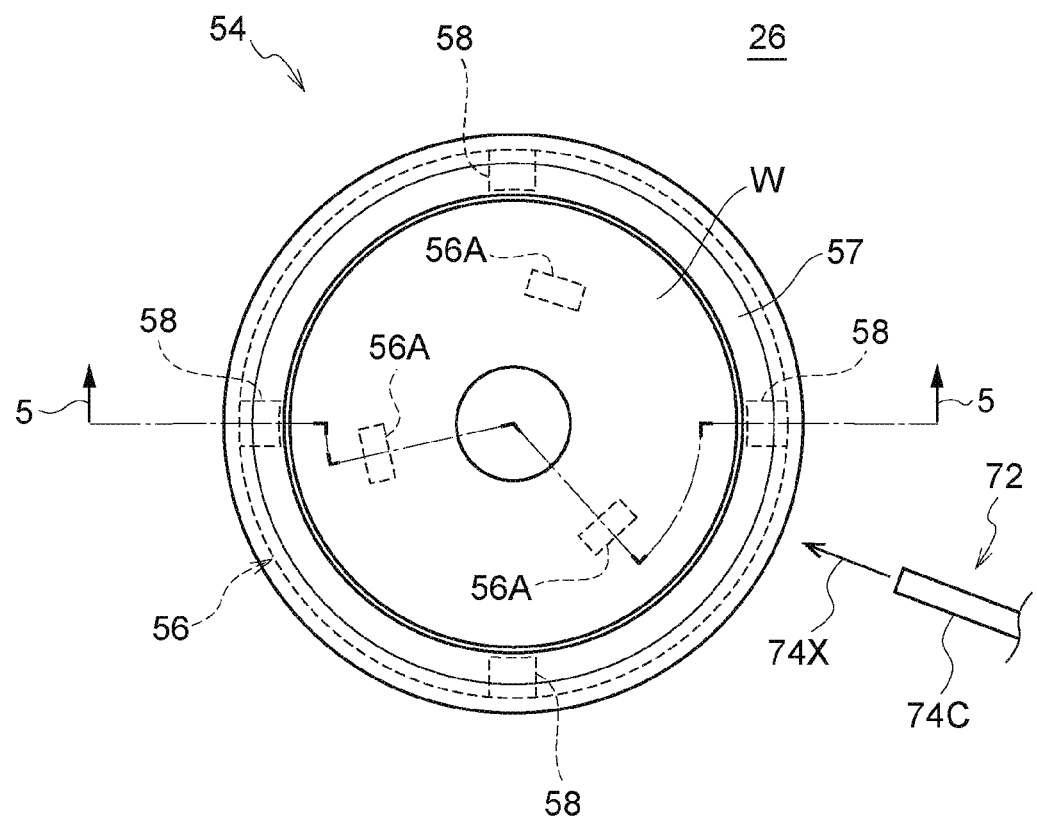
FIG. 6 is a plan view that simply illustrates a state wherein the objects to be processed are held.

FIG. 5 illustrates a sectional view of the chamber 26 for blowing air of the shot-peening device 10. In it the hatching of cross-sections is omitted. FIG. 6 illustrates a simplified plan view of the chamber 26 for blowing air that holds the object W. As in FIGS. 5 and 6, the small tables 54 are equipped with a jig 56 for holding the object W on which the object W is placed. Incidentally, the cross-sections of the jig 56 and its surrounding area as in FIG. 5 show a reduced sectional view along the line 5-5 in FIG. 6. The jig 56 has multiple supporting parts 56A (for example, three in this embodiment) that support the object W from below and are disposed with a gap in the circumferential direction between them in the plan view of the device. In the jig 56 the spans between the supporting parts 56A that are next to each other in the circumferential direction are formed as a notch that opens upwardly.

In this embodiment a tubular hood 57 is provided outside the object W in the plan view of the device. Multiple jigs 58 for the hood (for example, four in this embodiment) are provided to support the hood 57 from below. The jigs 58 for the hood are disposed with a gap in the circumferential direction, in the plan view of the device.

At the upper part of the chamber 24 for projecting the shots as in FIG. 3, a mechanism 66 for pressing (a jig for pressing) is provided. Since it is a known structure, the detailed explanation is omitted. Below, its outline is discussed. The mechanism 66 for pressing has a part 68A for pressing that presses the object W on the small tables 54 from above. The part 68A for pressing is the lower end of a shaft 68 for pressing. The upper end of the shaft 68 for pressing is supported by a bearing (not shown). The shaft 68 for pressing cannot vertically move in relation to the bearing. But it can rotate about its central axis in relation to it. By this configuration the part 68A for pressing can rotate about a vertical axis. The bearing can be vertically moved by a cylinder (an element that is recognized as "a vertically moving mechanism"), which is not shown. That is, by the action of the cylinder, the part 68A for pressing can be displaced between a position to press the object W and a retracted position that is higher than the position to press.

For example, the cylinder is a measuring device so that the mechanism 66 for pressing can detect the object W. Thus, shot-peening is carried out when the object W is definitely pressed.

As in FIG. 5, an air-blowing machine 72 is provided to the chamber 26 for blowing air. The air-blowing machine 72 has nozzles 74A, 74B, 74C. The nozzles 74A, 74B, 74C are connected to a part for supplying compressed air, which is not shown, through hoses 76A, 76B, 76C. By this configuration the air-blowing machine 72 blows gas through the nozzles 74A, 74B, 74C against the object W that has been transported to the chamber 26 for blowing air. In the air-blowing machine 72 the nozzles 74A, 74B, 74C can be vertically moved by means of a vertically moving mechanism, which is not shown.

As in FIG. 6, by the nozzle 74C, which is the blowing part of the air-blowing machine 72, the direction of the gas to be blown (the arrow 74X) is set so that the gas passes through a gap between the adjacent supporting parts 56A. Further, by the nozzle 74C the direction of the gas to be blown (the arrow 74X) is set so that the gas passes through a gap between the adjacent jigs 58 for the hood.

Next, a connection between the cabinet 12 and the dust collector 70 as in FIGS. 1 and 4 is discussed.

A structure 40 for the flow path that connects the inside of the cabinet 12 and the suction port 70A of the dust collector 70 includes a first flow path 40X that constitutes a part of the route for circulation of the circulating machine 32 (the duct 34A in FIG. 3 and the first cyclone 36). In the structure 40 for the flow path, the classifying part 35 is provided that classifies the particulate objects that include the shots as shots that have a diameter that makes them reusable and as the other particulate objects. The first cyclone 36, which constitutes a part of the classifying part 35, includes a part of the first flow path 40X.

The structure 40 for the flow path includes a second flow path 40Y that connects the chamber 26 for blowing air (see FIG. 4) and the suction port 70A (see FIG. 1) of the dust collector 70. In the second flow path 40Y a second cyclone 44 as a second classifier is provided. That is, the second cyclone 44 includes a part of the second flow path 40Y. It constitutes a part of the classifying part 35. The second cyclone 44 and the first cyclone 36 are positioned apart from each other. The first cyclone 36 is nearer from the cabinet 12 than the second cyclone 44 is.

As in FIG. 1, the second cyclone 44 has a cyclone-case 44H. The top of the cyclone-case 44H is connected to the suction port 70A of the dust collector 70 through a duct 42C and the duct 34B. One end of the duct 42C is connected to the top of the cyclone-case 44H and the other end is connected to the flow path of the duct 34B.

The upper part 44A of the cyclone-case 44H is formed as a vertical cylinder and the lower part 44B is formed as a cone, which has a smaller diameter, as it is lower. On the side wall of the upper part 44A of the cyclone-case 44H a part 44X for inflow is formed to cause air to flow along the inner surface of the upper part 44A. The part 44X for inflow has an approximately cylindrical shape. One end of a duct 42B is connected to it. The other end of it is connected to the ceiling of the chamber 20 for taking in and out (see FIG. 4). One end of a duct 42A is connected to the flow path of the duct 42B at a position that is near the other end. In other words, the structure 40 for the flow path includes a third flow path 40Z that connects the chamber 20 for taking in and out (see FIG. 4) and the suction port 70A of the dust collector 70. The second cyclone 44 includes a part of the third flow path 40Z. As in FIG. 4, the other end of the duct 42A is connected to the ceiling of the chamber 26 for blowing air.

As in FIG. 1, the lower opening of the lower part 44B of the cyclone-case 44H is connected to a box 44Z for collection. By the above configuration, the second cyclone 44 classifies the particulate objects that include the shots as shots that have a diameter that makes them reusable and as the other particulate objects. As in FIG. 2, the box 44Z for collection is connected through a pipe 32J to the receiving box 32E that is provided at the lower end of the bucket elevator 32F. That is, the shots that have a diameter that makes them reusable and that have been separated by the second cyclone 44 are supplied to the lower end of the bucket elevator 32F through the pipe 32J and the receiving box 32E. In the figure, the middle part of the pipe 32J is omitted and drawn by a dotted line.

Functions and Advantageous Effects of Embodiment

Next, the functions and advantageous effects of the embodiment are discussed.

The object W to be processed is transported by the machine 90 for taking in and out as in FIG. 4 to the chamber 20 for taking in and out in the cabinet 12. The object W that has been taken in the cabinet 12 is transported by the transporter 50 in the set direction for transportation (the arrow X). After it stays for a time in the idle chamber 22, it is transported to the chamber 24 for projecting the shots. The object W that has been transported to the chamber 24 for projecting the shots is pressed by the mechanism 66 for pressing (see FIG. 3). Then the blasting machine 30 projects the shots onto the object W. After projecting the shots for a set time, the object W is released from the mechanism 66 for pressing (see FIG. 3) that presses it. It is transported to the chamber 26 for blowing air. The air-blowing machine 72 as in FIG. 5 blows gas on the object W that has been transported to the chamber 26 for blowing air. Then the object W is transported to the chamber 20 for taking in and out as in FIG. 4. It is taken out of the cabinet 12 from the chamber 20 for taking in and out by the machine 90 for taking in and out.

The shots that have been projected by the blasting machine 30 as in FIG. 3, etc., and have dropped on the bottom of the chamber 24 for projecting the shots are transported by means of the lower-side screw conveyor 32B to the box 32C for collection. The shots that have been transported to the box 32C for collection are supplied to the lower end of the bucket elevator 32F through the duct 34A, the first cyclone 36, the pipe 32D as in FIG. 1, and the receiving box 32E. After having been transported above the device by the bucket elevator 32F, they are supplied to the upper-side hopper 30H through a receiving box 32G and a pipe 32H. That is, the shots that have been projected by the blasting machine 30 as in FIG. 3 and have dropped on the bottom of the chamber 24 for projecting the shots are circulated to the blasting machine 30 by means of the circulating machine 32.

The dust collector 70 as in FIG. 4, which is connected to the cabinet 12, suctions air in the cabinet 12 that contains dust. The structure 40 for the flow path, which connects the inside of the cabinet 12 and the suction port 70A (see FIG. 1) of the dust collector 70 includes the first flow path 40X that constitutes a part of the route for circulation of the circulating machine 32. The first cyclone 36 includes a part of the first flow path 40X. The first cyclone 36 classifies the particulate objects that include the shots as shots that have a diameter that makes them reusable and as the other particulate objects. Thus, the circulating machine 32 can circulate the shots that have a diameter that makes them reusable to the blasting machine 30.

The structure 40 for the flow path includes the second flow path 40Y that connects the chamber 26 for blowing air and the suction port 70A (see FIG. 1) of the dust collector 70. The second cyclone 44 includes a part of the second flow path 40Y. Thus, the particulate objects that are stirred up from the object W, etc., because of air-blowing caused by the air-blowing machine 72 (see FIG. 5) in the chamber 26 for blowing air, are suctioned to the second flow path 40Y. They are classified as shots that have a diameter that makes them reusable and as the other particulate objects by means of the second cyclone 44. Thus, the shots are prevented from being taken out of the cabinet or from scattering, so that the shots can be effectively reused.

In the present embodiment, the second cyclone 4 includes a part of the third flow path 40Z and is connected to the chamber 20 for taking in and out in the cabinet 12 through the duct 42B. Thus, even if the particulate objects in the chamber 26 for blowing air are not all suctioned and transported to the chamber 20 for taking in and out, the particulate objects in the chamber 20 for taking in and out are suctioned to the duct 42B, which is connected to the chamber 20. The particulate objects that have been suctioned are classified as shots that have a diameter that makes them reusable and as the other particulate objects by means of the second cyclone 44. Thus, the shots are prevented from being taken out of the chamber 20 for taking in and out or from scattering, so that the shots can be effectively reused.

In the present embodiment, the first cyclone 36, which includes a part of the first flow path 40X, is located nearer from the cabinet 12 than the second cyclone 44 is, which includes a part of the second flow path 40Y. Thus, the shots can be circulated with less loss.

In the present embodiment, the jig 56 for the object W as in FIG. 6 has multiple supporting parts 56A that are located with a gap in the circumferential direction between them in the plan view of the device and that support the object W from below. The direction of blowing air (the arrow 74X) through the nozzle 74C of the air-blowing machine 72 is set to cause the air to pass through a gap between the adjacent supporting parts 56A. Thus, the particulate objects that have adhered to the lower part of the object W are blown off and away by gas that is blown through the nozzle 74C of the air-blowing machine 72, to be suctioned to the duct 42A (see FIG. 4). Thus, the particulate objects that have adhered to the lower part of the object W can be effectively removed.

Further, in the present embodiment, the tubular hood 57 is provided outside the object W in the plan view of the device so that no shots hit the outside of the object W. Multiple jigs 58 for the hood that are located with a gap in the circumferential direction in the plan view of the device support the hood 57 from below. The direction of blowing air (the arrow 74X) through the nozzle 74C is set to cause the air to pass through a gap between the adjacent jigs 58 for the hood. Thus, when the hood 57 is provided outside the object W, the particulate objects that have adhered to the lower part of the object W are blown off and away by gas that is blown through the nozzle 74C, to be suctioned to the duct 42A (see FIG. 4). Thus, the particulate objects that have adhered to the lower part of the object W can be effectively removed.

In the present embodiment, the receiving part 80 at the side for taking out as in FIG. 2 protrudes from a position under the port 14 for carrying in and out (see FIG. 1) of the cabinet 12 in the plan view of the device as in FIG. 4. Thus, if the particulate objects drop from the port 14 for carrying in and out (see FIG. 1) or its surrounding area when the object W is taken out of the cabinet 12, they are received by the receiving part 80 at the side for taking out. Thus, the floor in front of the port 14 for carrying in and out (see FIG. 1) is prevented from becoming dirty from the particulate objects. As in FIG. 7, the receiving part 80 at the side for taking out is connected to the cabinet 12 by means of the duct 82 for taking out. The duct 82 for taking out causes the shots that have dropped on the receiving part 80 at the side for taking out to flow to the lower part of the chamber 24 for projecting the shots (the upstream side of the route for circulation of the circulating machine 32) in the cabinet 12. Thus, the shots that have dropped from the port 14 for carrying in and out (see FIG. 1) or its surrounding area can be returned to the blasting machine 30 (see FIG. 3).

In the present embodiment, the access door 18, which is shown in FIG. 2, etc., can open and close the side opening 16 of the cabinet 12. The receiving part 84 at the side wall protrudes from a position under the side opening 16 of the cabinet 12 in the plan view of the device as in FIG. 4. Thus, if the particulate objects drop from the side opening 16 or its surrounding area when the access door 18 is opened to check or clean the inside of the cabinet 12, the particulate objects are received by the receiving part 84 at the side wall. Thus, the part of the cabinet under the side opening 16 is prevented from becoming dirty. The receiving part 84 at the side wall is connected to the cabinet 12 through the duct 86 at the side wall. The duct 86 at the side wall causes the shots that have dropped on the receiving part 84 at the side wall to flow to the lower part of the cabinet 12 (the upstream side of the route for circulation of the circulating machine 32). Thus, the shots that have dropped from the port 16 for carrying in and out (see FIG. 1) or its surrounding area can be returned to the blasting machine 30 (see FIG. 3).

As discussed above, by the shot-peening device 10 of the present embodiment the shots are effectively reused and are prevented from being taken out of the cabinet 12 or from scattering.

As a supplement, since micro-shots are expensive when used as the shots, there is a need to effectively reuse the shots. For example, the object to be processed is assumed to be a pulley for a CVT. If a pulley for a CVT is taken out of the cabinet, while the micro-shots adhere to it, and is used as a part of a machine, the machine may cause trouble. By the present embodiment, the shots are effectively reused and the object to which the shots adhere is prevented, or is effectively suppressed, from being taken out.

In the present embodiment, a cylindrical ventilator 46 for taking in the outside air is provided to the ceiling 12U of the cabinet 12 as in FIG. 1. In the ventilator 46 the cartridge 48 is provided. The cartridge 48 has the filter 48F, wherein a filter medium is horizontally folded in a zig-zag manner. Thus, the ventilator 46 is prevented from clogging.

Supplemental Explanation of Embodiment

By the above embodiment, the shot-processing device is the shot-peening device 10. However, it may be a shot-blasting device or a device for both shot-peening and shot-blasting.

By the above embodiment, the shot-projecting machine is the blasting machine 30 of an air-nozzle type as in FIG. 4, etc. However, it may be a shot-projecting machine other than the blasting machine 30, such as a shot-projecting machine of a centrifugal type.

By the above embodiment, the shots are micro-shots that are very fine particles. However, shots other than the micro-shots may be used for the shot-processing device. Further, by the above embodiment, the classifiers are the first cyclone 36 and the second cyclone 44. However, the classifiers may be ones other than cyclones.

By the above embodiment, the transporter 50 transports the object W in the circumferential direction in the cabinet 12. However, the transporter as a modified example may linearly transport the object in the set direction for transportation, wherein the upstream end or downstream end of the route for transportation is outside the cabinet and the cabinet is in the route for transportation. In such a cabinet, the chamber for projecting the shots, the chamber for blowing air, and the chamber for taking out, are formed in this order from the upstream side.

By the above embodiment, the second cyclone 44 is connected to the chamber 26 for blowing air and to the chamber 20 for taking in and out, through the ducts 42B and 42A. However, in a modified example, the second cyclone 44, as a second classifier, which includes a part of the second flow path 40Y, may be connected to the chamber 26 for blowing air through a duct, but need not be connected to the chamber 20 for taking in and out.

By the above embodiment, both the first cyclone 36 and the second cyclone 44 are provided. However, as a modified example, a classifier that includes a part of the first flow path 40X and a classifier that includes a part of the second flow path 40Y may be integrated.

By the above embodiment, the first flow path 40X and the second flow path 40Y are separately formed without any combined part. However, they may be formed with a combined part. By the above embodiment, the third flow path 40Z has a part that is used as the second flow path 40Y (a part combined with the second flow path 40Y). However, the third flow path may be formed without any part that is used as the second flow path 40Y. In such a case a classifier (an element that is a part of a classifying part) that includes a part of the third flow path may be separately formed. By the above embodiment, the third flow path 40Z has no part that is used as the first flow path 40X. However, it may be formed with a part that is used as the first flow path.

By the above embodiment the jig 56 as in FIG. 6 has multiple supporting parts 56A that support the object from below and are located with a gap in the circumferential direction in the plan view of the device. Though this configuration is preferable, the jig may have a supporting part that supports the object from below and is formed as a ring in the plan view of the device.

By the above embodiment, the tubular hood 57 is provided outside the object in the plan view of the device. However, such a hood does not need to be provided, depending on the purpose of the surface treatment.

By the above embodiment, multiple jigs 58 for the hood support the hood 57 from below and are located with a gap in the circumferential direction in the plan view of the device. Though this configuration is preferable, as a modified example a jig for the hood may support the hood from below and may be formed as a ring in the plan view of the device.

By the above embodiment, the receiving part 80 at the side for taking out and the duct 82 for taking out are provided as in FIG. 7. Though this configuration is preferable, as a modified example they are not necessarily provided.

By the above embodiment, the receiving part 84 at the side wall and the duct 86 at the side wall are provided as in FIG. 2, etc. Though this configuration is preferable, as a modified example they are not necessarily provided.

By the above embodiment, the cartridge 48 is provided in the ventilator 46 for taking in the outside air as in FIG. 1. Though this configuration is preferable, a sponge-like element that is made of a stainless steel may be provided in it.

As a modified example of the above embodiment, the bucket elevator 32F is not provided and the lower end of the first cyclone 36 and the upper-side hopper 30H may be connected by means of a pipe.

The above embodiment and any of the above-mentioned modifications may be appropriately combined.

Above an embodiment of the present invention is discussed. The present invention is not limited by the above discussions. It can be obviously implemented with any modifications other than those specified in the above discussion, insofar as it does not deviate from the gist of the invention.

Below, the reference signs used in the present specification and the drawings are listed.

10 the shot-peening device (the shot-processing device)
12 the cabinet
12U the ceiling of the cabinet
14 the port for carrying in and out (the port for taking out)
16 the side opening
18 the access door
20 the chamber for taking in and out (the chamber for taking out an object to be processed)
24 the chamber for projecting the shots
26 the chamber for blowing air
30 the projecting machine (the shot-projecting machine)
32 the circulating machine
35 the classifying part
36 the first cyclone (the first classifier)
40 the structure for the flow path
40X the first flow path
40Y the second flow path
40Z the third flow path
44 the second cyclone (the second classifier)
46 the ventilator
48 the cartridge
48F the filter
50 the transporter
56 the jig
56A the supporting parts
57 the hood
58 the jigs for the hood
70 the dust collector
70A the suction port of the dust collector
72 the air-blowing machine
74C the nozzle (the blowing part)
74X the direction of the gas to be blown
80 the receiving part at the side for taking out
82 the duct for taking out
84 the receiving part at the side wall
86 the duct at the side wall
W the object to be processed

The invention claimed is:

1. A shot-processing device comprising:
   a cabinet in which multiple chambers are formed;
   a transporter that transports an object to be processed in a predetermined transport direction within at least the cabinet;
   a shot-projecting machine that is placed in a chamber for projecting the shots, which is one of the multiple chambers, and that projects the shots onto the object to be processed that has been transported into the chamber for projecting the shots;
   an air-blowing machine that is placed in a chamber for blowing air, which is one of the multiple chambers, that is downstream of the chamber for projecting the shots in the predetermined transport direction, which machine blows air onto the object to be processed that has been transported into the chamber for blowing air;

a circulating machine that circulates the shots that have a diameter that makes them reusable among the shots that have been projected by the shot-projecting machine and have dropped on a bottom of the chamber for projecting the shots;

a dust collector that is connected to the cabinet to suction air therein that contains dust;

a flow path structure including a first flow path and a second flow path, the first flow path configured to form a part of a flow path to connect the inside of the cabinet with a suction port of the dust collector and configured to be a part of a route for circulation of the circulating machine, and the second flow path configured to connect the chamber for blowing air with the suction port of the dust collector; and a classifying part that is provided in the flow path structure, which includes a part of the first flow path and a part of the second flow path, and that classifies particulate objects that include the shots as shots that have a diameter that makes them reusable and as other particulate objects.

2. The shot-processing device of claim 1, wherein the classifying part comprises a first classifier that includes a part of the first flow path and a second classifier that is a separate body from the first classifier and includes a part of the second flow path, wherein the first classifier is located nearer the cabinet than is the second classifier.

3. The shot-processing device of claim 2, wherein the flow path structure comprises a third flow path that connects a chamber for taking out an object to be processed with the suction port of the dust collector, wherein the chamber for taking out an object to be processed is one of the multiple chambers in the cabinet that is located at a side for taking out the object to be processed, and wherein the classifying part includes a part of the third flow path.

4. The shot-processing device of claim 3, wherein the classifying part that constitutes a part of the third flow path is the second classifier.

5. The shot-processing device of claim 1, further comprising:

a jig for holding the object to be processed, on which jig the object to be processed is placed, wherein the jig has supporting parts that support the object to be processed from the lower part and are provided with a gap in a circumferential direction in the plan view of the device, and wherein the air-blowing machine has a blowing part in which a direction for blowing is set so that air that is blown therefrom passes between adjacent supporting parts.

6. The shot-processing device of claim 5, further comprising:

a tubular hood that is located outside the object to be processed in the plan view of the device; and jigs for the hood that support the hood from a bottom, wherein the jigs are provided with a gap in a circumferential direction in the plan view of the device, and wherein in the blowing part the direction for blowing is set so that air that is blown therefrom passes between adjacent jigs for supporting the hood.

7. The shot-processing device of claim 1, further comprising:

a receiving part at a side for taking out that protrudes from the cabinet under a port for taking out, in the plan view of the device; and a duct for taking out that connects a receiving part at the side for taking out with the cabinet and causes the shots that have dropped on the receiving part at the side for taking out to flow to an upstream side of the route for circulation in the cabinet.

8. The shot-processing device of claim 1, further comprising:

an access door to open and close a side opening of the cabinet;

a receiving part at a side wall under the side opening, which part protrudes from the cabinet in the plan view of the device; and a duct at the side wall that connects the receiving part at the side wall with the cabinet and causes the shots that have dropped on the receiving part at the side wall to flow to an upstream side of the route for circulation in the cabinet.

9. The shot-processing device of claim 1, further comprising:

a cylindrical ventilator that is provided to a ceiling of the cabinet and that takes ambient air in; and a cartridge that is placed in the ventilator and has a filter that is pleated and faces horizontally.

10. The shot-processing device of claim 1, wherein the flow path structure comprises a third flow path that connects a chamber for taking out an object to be processed with the suction port of the dust collector, wherein the chamber for taking out an object to be processed is one of the multiple chambers in the cabinet that is located at a side for taking out the object to be processed, and wherein the classifying part includes a part of the third flow path.

\* \* \* \* \*